(12) United States Patent
Dufour et al.

(10) Patent No.: US 9,381,987 B1
(45) Date of Patent: Jul. 5, 2016

(54) AIR-BASED-DEPLOYMENT-COMPATIBLE UNDERWATER VEHICLE CONFIGURED TO PERFORM VERTICAL PROFILING AND, DURING INFORMATION TRANSMISSION, PERFORM MOTION STABILIZATION AT A WATER SURFACE, AND ASSOCIATED METHODS

(71) Applicant: MRV SYSTEMS, LLC, San Diego, CA (US)

(72) Inventors: James Edward Dufour, Solana Beach, CA (US); Brian Kenneth Newville, San Diego, CA (US)

(73) Assignee: MRV SYSTEMS, LLC, San Diego, CA (US)

( * ) Notice: Subject to any disclaimer, the term of this patent is extended or adjusted under 35 U.S.C. 154(b) by 0 days.

(21) Appl. No.: 14/873,067

(22) Filed: Oct. 1, 2015

(51) Int. Cl.
*B63G 8/14* (2006.01)
*B63G 8/20* (2006.01)
*B63B 39/00* (2006.01)
*B64D 1/12* (2006.01)
*B63G 8/00* (2006.01)

(52) U.S. Cl.
CPC . *B63G 8/20* (2013.01); *B63B 39/00* (2013.01); *B63G 8/001* (2013.01); *B64D 1/12* (2013.01); *B63B 2211/02* (2013.01); *B63G 2008/002* (2013.01)

(58) Field of Classification Search
CPC .. B63B 22/003; B63B 22/18; B63B 2211/02; B63B 39/00; B63G 8/001; B63G 8/20; B63G 2008/002; B64D 1/12
USPC .......................................... 114/331; 367/3, 4
See application file for complete search history.

(56) References Cited

U.S. PATENT DOCUMENTS

| | | | |
|---|---|---|---|
| 310,342 A | 1/1885 | Walker | |
| 718,450 A | 1/1903 | Gillette | |
| 3,047,259 A * | 7/1962 | Tatnall | F42B 15/22 102/386 |
| 3,115,831 A * | 12/1963 | Suter | F42B 10/58 102/388 |
| 3,157,145 A | 11/1964 | Farris | |
| 3,290,642 A * | 12/1966 | Mason | B63B 22/003 367/120 |
| 3,329,119 A | 7/1967 | Fritzsche | |
| 3,946,685 A | 3/1976 | Chadbourne | |
| 4,007,505 A * | 2/1977 | Nowatzki | B63G 8/14 114/331 |

(Continued)

OTHER PUBLICATIONS

Schofield, Oscar, The Robot Ocean Network, American Scientist, Nov.-Dec. 2013, pp. 434-441.

*Primary Examiner* — Anthony Wiest
(74) *Attorney, Agent, or Firm* — Sheppard Mullin Richter & Hampton LLP

(57) ABSTRACT

An air-based-deployment-compatible underwater vehicle that may be configured to perform vertical profiling is described. The vehicle may be configured, during information transmission, to perform motion stabilization at a water surface. A body of the vehicle may have a cylindrical shape. Buoyancy control components of the vehicle may be disposed within the body. The buoyancy control components may be configured to adjust a volume and/or buoyancy of the vehicle to facilitate vertical profiling. Fins may be hingedly disposed on the body at one or more locations on the vehicle. The fins may be movable between a first configuration and a second configuration. The fins, in the first configuration, may be positioned substantially flat against the body. The fins, in the second configuration, may extend radially outward to slow descent and to provide motion stabilization. The fins may be pitched to rotate the vehicle about a longitudinal axis during vertical profiling.

7 Claims, 12 Drawing Sheets

(56) References Cited

U.S. PATENT DOCUMENTS

| | | |
|---|---|---|
| 4,204,806 A | 5/1980 | Blanchard |
| 4,954,110 A | 9/1990 | Warnan |
| 5,121,702 A | 6/1992 | Johnson |
| 5,235,930 A | 8/1993 | Pendleton |
| 5,551,363 A | 9/1996 | Cipolla |
| 5,602,801 A * | 2/1997 | Nussbaum ............... G01S 7/521 114/21.3 |
| 6,786,087 B2 | 9/2004 | Desa |
| 7,131,389 B1 | 11/2006 | Hawkes |
| 7,610,871 B2 | 11/2009 | Leclercq et al. |
| 7,752,988 B2 | 7/2010 | Axford |
| 8,127,704 B2 | 3/2012 | Vosburgh |
| 8,205,570 B1 | 6/2012 | Tureaud et al. |
| 8,265,809 B2 | 9/2012 | Webb |
| 8,397,657 B2 | 3/2013 | Guerrero |
| 8,499,708 B2 * | 8/2013 | Roodenburg ........... B63B 39/00 114/124 |
| 2007/0125289 A1 | 6/2007 | Asfar |

\* cited by examiner

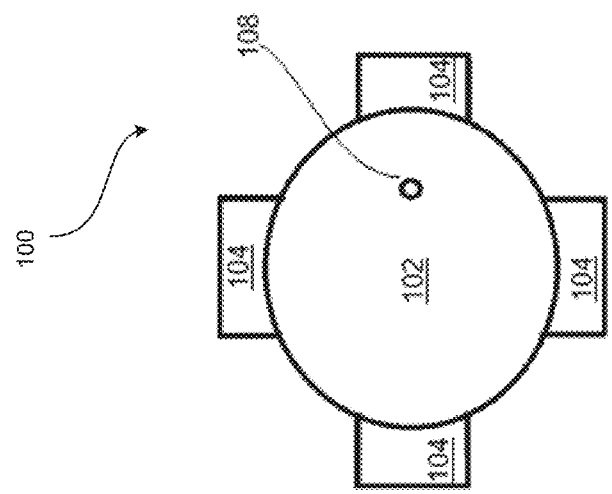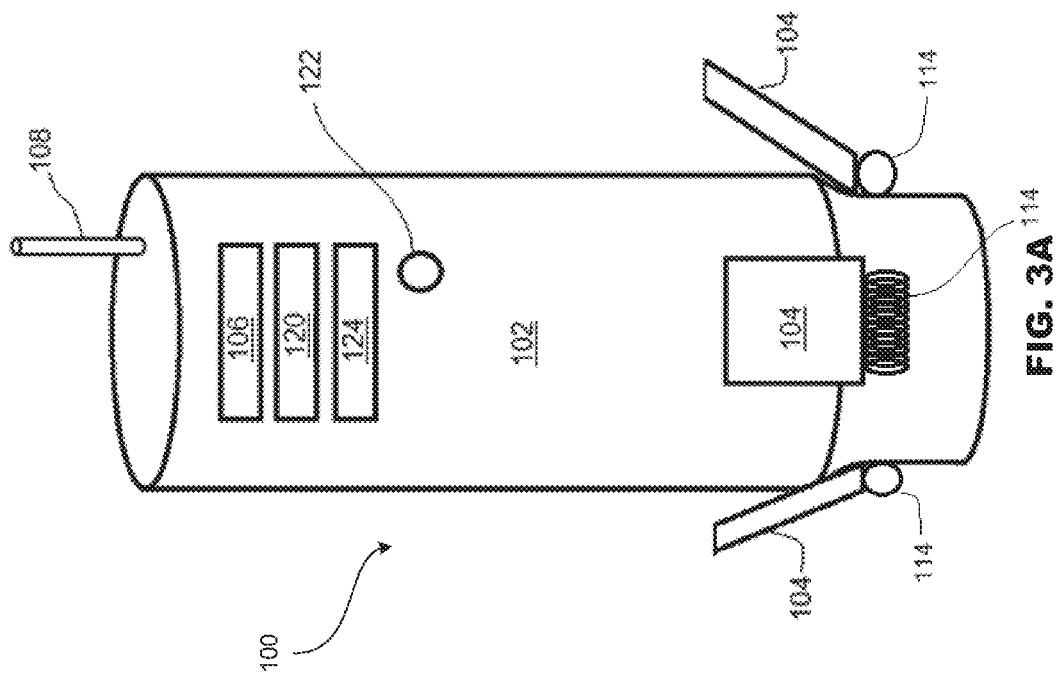

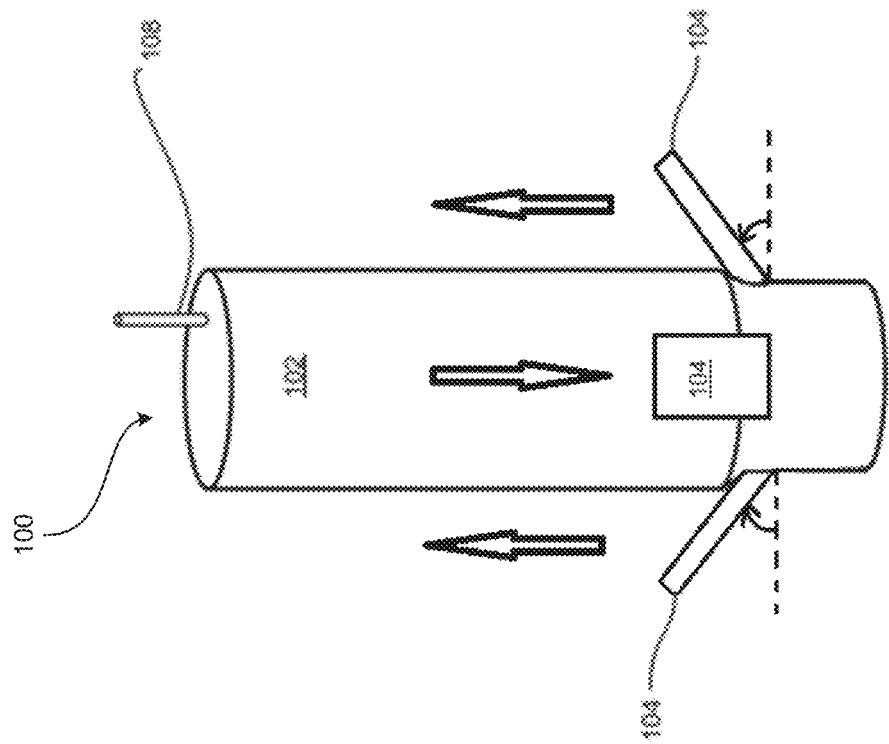
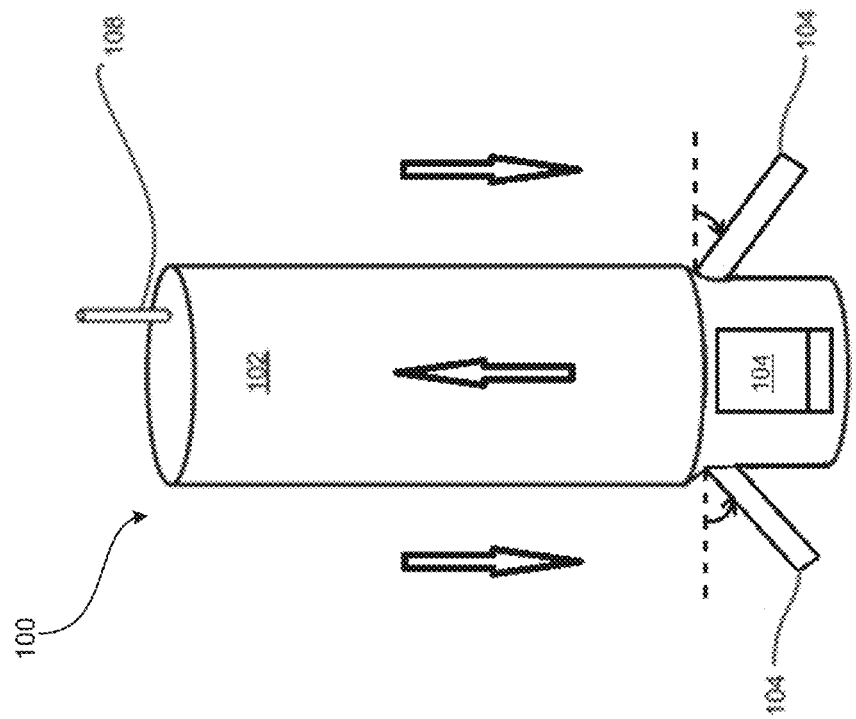

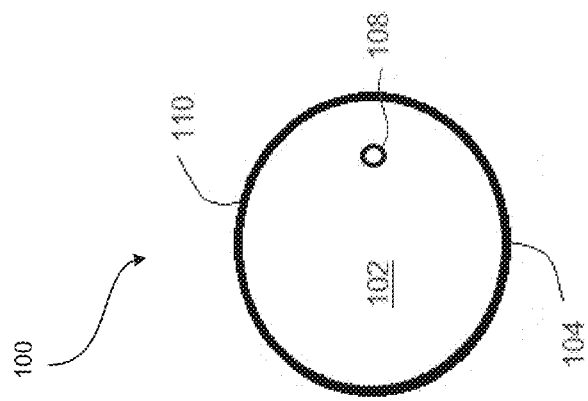
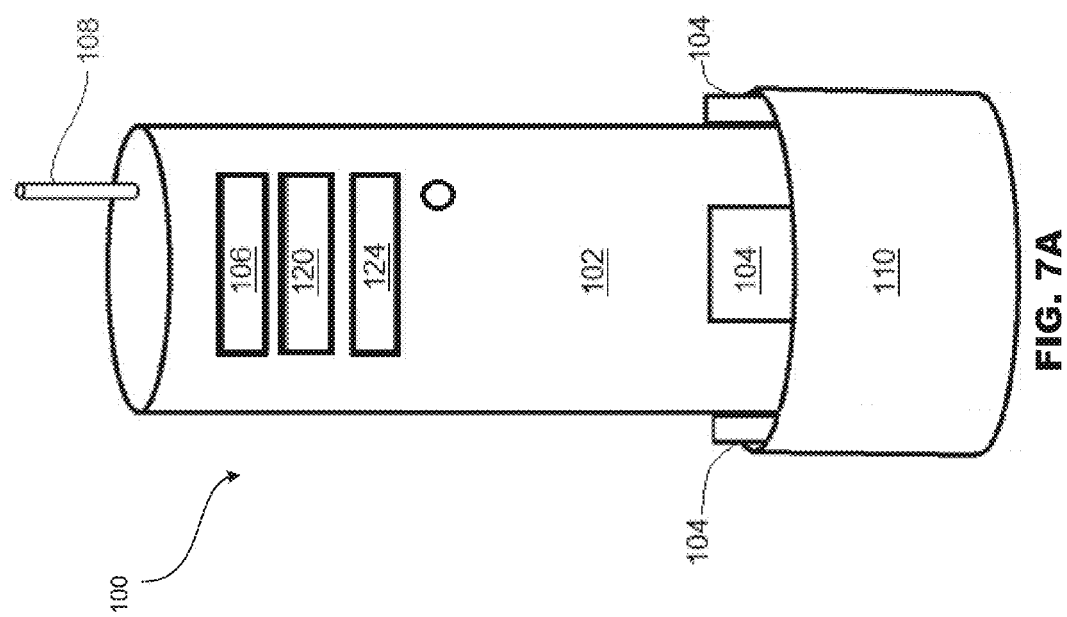
FIG. 7B
FIG. 7A

US 9,381,987 B1

AIR-BASED-DEPLOYMENT-COMPATIBLE UNDERWATER VEHICLE CONFIGURED TO PERFORM VERTICAL PROFILING AND, DURING INFORMATION TRANSMISSION, PERFORM MOTION STABILIZATION AT A WATER SURFACE, AND ASSOCIATED METHODS

FIELD

The disclosure relates to an air-based-deployment-compatible underwater vehicle configured to perform vertical profiling and, during information transmission, perform motion stabilization at a water surface, and associated methods.

BACKGROUND

A conventional profiling float may be an oceanographic instrument platform that changes its buoyancy in order to move vertically in an ocean. Conventional profiling floats may repeatedly collect information with sensors at a range of depths ("profiles"). Common sensors may include temperature, conductivity, and pressure (from which salinity can be calculated), though a wide range of other sensors have been deployed on floats. Conventional profiling floats may transmit collected data at a water surface by radio transmission to one or more satellites and/or other signal receivers.

SUMMARY

Exemplary implementations may provide an underwater vehicle configured to perform vertical profiling and water-surface motion stabilization during information transmission. Such stabilization may prevent an antenna that transmits collected information from becoming submerged in wavy conditions, thus preventing transmission interruptions. According to some implementations, the vehicle may be configured to: (1) be deployed from a deployment tube, (2) measure vertical current, (3) provide directional resolution of underwater objects, and/or perform other functions. An air deployment tube may deploy the vehicle from a water-surface (e.g., a boat) or from an elevation above the water surface (e.g., an airplane, glider, and/or helicopter).

One aspect of the disclosure relates to an air-based-deployment-compatible underwater vehicle configured to perform vertical profiling and, during information transmission, perform motion stabilization at a water surface. The vehicle may comprise a body with a cylindrical shape. The vehicle may include buoyancy control components disposed within the body. The buoyancy control components may be configured to adjust a buoyancy of the vehicle to facilitate vertical profiling. The vehicle may include fins disposed on the body. The fins may be hingedly attached to the body. The fins may be movable between a first configuration and a second configuration. In the first configuration the fins may be positioned substantially flat against the body. In the second configuration the fins may extend radially outward from the body to slow descent and to provide motion stabilization to the vehicle.

Another aspect of the disclosure relates to a method for deploying an underwater vertical profiling vehicle from a deployment tube of an aircraft or surface vessel. The vehicle may comprise a body, buoyancy control components, and fins. The body may have a cylindrical shape. The buoyancy control components may be disposed within the body. The buoyancy control components may be configured to adjust a buoyancy of the vehicle to facilitate vertical profiling. The fins may be disposed on the body. The fins may be hingedly attached to the body. The fins may be movable between a first configuration and a second configuration. In the first configuration the fins may be positioned substantially flat against the body. In the second configuration the fins may extend radially outward from the body to slow descent and to provide motion stabilization to the vehicle. The method may include positioning the fins into the first configuration. The fins may be secured in the first configuration such that the fins remain in the first configuration during deployment. The vehicle may be deployed by sending the vehicle through the deployment tube. Responsive to contact with water, the fins may be released to facilitate movement of the fins between the first configuration and the second configuration during vertical profiling.

Another aspect of the disclosure relates to a method for measuring vertical current with an underwater vertical profiling vehicle. The vehicle comprising a body, buoyancy control components, and fins. The body may have a cylindrical shape. The buoyancy control components may be disposed within the body. The buoyancy control components may be configured to adjust a buoyancy of the vehicle to facilitate vertical profiling. The fins may be disposed on the body. The fins may be hingedly attached to the body. The fins may be movable between a first configuration and a second configuration. In the first configuration the fins may be positioned substantially flat against the body. In the second configuration the fins may extend radially outward from the body to slow descent and to provide motion stabilization to the vehicle. The fins in the second configuration may be pitched so as to revolve the vehicle about a longitudinal axis of the vehicle during vertical profiling. The method may include controlling the buoyancy of the vehicle so that the vehicle descends. As the vehicle descends the vehicle may revolve about the longitudinal axis due to the pitch of the fins. A number of revolutions experienced by the vehicle may be determined during the descent of the vehicle. A water displacement of the vehicle may be determined based on the number of revolutions. A distance of travel during the descent may be determined based on depth information. The vertical current may be determined based on a difference between the determined water displacement and the determined distance of travel.

Another aspect of the disclosure relates to a method for providing directional resolution in sensing underwater objects using an underwater vertical profiling vehicle. The vehicle may include a body, buoyancy control components, and fins. The body may have a cylindrical shape. The buoyancy control components may be disposed within the body. The buoyancy control components may be configured to adjust a buoyancy of the vehicle to facilitate vertical profiling. The fins may be disposed on the body. The fins may be hingedly attached to the body. The fins may be movable between a first configuration and a second configuration. In the first configuration the fins may be positioned substantially flat against the body. In the second configuration the fins may extend radially outward from the body to slow descent and to provide motion stabilization to the vehicle. The fins in the second configuration may be pitched so as to revolve the vehicle about a longitudinal axis of the vehicle during vertical profiling. One or more sensors may be disposed on an individual fin. The method may include controlling the buoyancy of the vehicle so that the vehicle descends. As the vehicle descends, the vehicle may revolve about the longitudinal axis due to the pitch of the fins. A first sensor disposed on a first fin may sense an underwater object. A second sensor may be disposed on a second fin to sense the underwater object. The first sensor may provide a first signal that increases in strength when the first fin is pointed toward the underwater object and decreases in strength when the first fin is pointed away from the underwater object. The second sensor may provide a second signal that increases in strength when the second fin is pointed toward the underwater object and decreases in strength when the second fin is pointed away from the underwater object. The underwater objects directional resolution relative to the vehicle may be determined based on the first signal and the second signal.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3A illustrates a side view of an underwater vehicle in a third configuration, in accordance with one or more implementations.

FIG. 3B illustrates a top view of an underwater vehicle in a third configuration, in accordance with one or more implementations.

FIG. 5A illustrates movement of fins in response to assent of the vehicle, in accordance with one or more implementations.

FIG. 5B illustrates movement of the fins in response to descent of the vehicle, in accordance with one or more implementations.

FIG. 7A illustrates a side view of an underwater vehicle fitted with a cap in one example configuration for deployment of the vehicle, in accordance with one or more implementations.

FIG. 7B illustrates a top view of an underwater vehicle fitted with a cap in one example configuration for deployment of the vehicle, in accordance with one or more implementations.

DETAILED DESCRIPTION

Figures 1A, 1B:
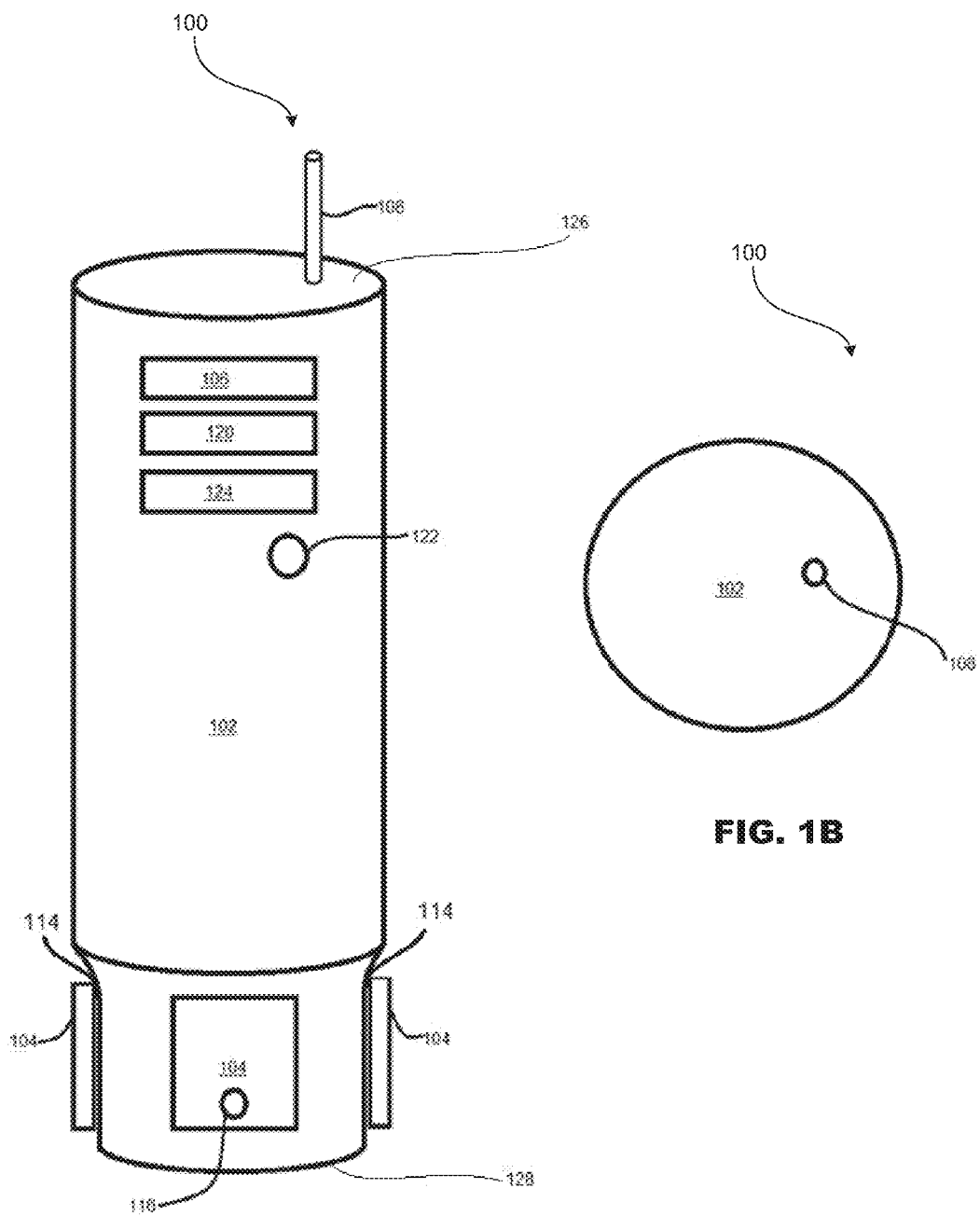
FIG. 1A illustrates a side view of an underwater vehicle in a first configuration, in accordance with one or more implementations.
FIG. 1B illustrates a top view of an underwater vehicle in a first configuration, in accordance with one or more implementations.

FIG. 1 illustrates an air-based-deployment-compatible underwater vehicle 100 configured to perform vertical profiling and, during information transmission, perform motion stabilization at a water surface, in accordance with one or more implementations. In some implementations, vehicle 100 may include one or more of a body 102, fins 104, buoyancy control components 106, an antenna 108, a sensor 116, a transmitter 120, a compass 122, a processor 124, and/or other components.

Body 102 may have a cylindrical shape. Body 102 may be shaped to provide structural rigidity against external pressures (e.g., hoop stress). In some implementations, body 102 may be designed in a cylindrical shape to optimize the structural distribution of pressure forces generated during vertical profiling. Body 102 may be formed of one or more of a ceramic material, a polymeric material, a metallic material, composite materials, and/or other materials. Body 102 may be constructed such that volume of body 102 is related to a mass of body 102 and/or any additional components to control the buoyancy of vehicle 100. For example, the buoyancy of vehicle 100 may be substantially equal to the buoyancy of water.

One or more fins 104 may be disposed on body 102. Fins 104 may be shaped as a section of a cylinder. Fins 104 may be disposed on vehicle 100 along any section of body 102. For example, vehicle 100 may be oriented with a top 126 of vehicle 100 and a bottom 128 of vehicle 100 during vertical profiling. In some implementations, fins 104 may be disposed near bottom 128 of vehicle 100. Fins 104 may be disposed near the top 126, the bottom 128, a middle, and/or on other locations of vehicle 100 and/or body 102.

Figure 2B:
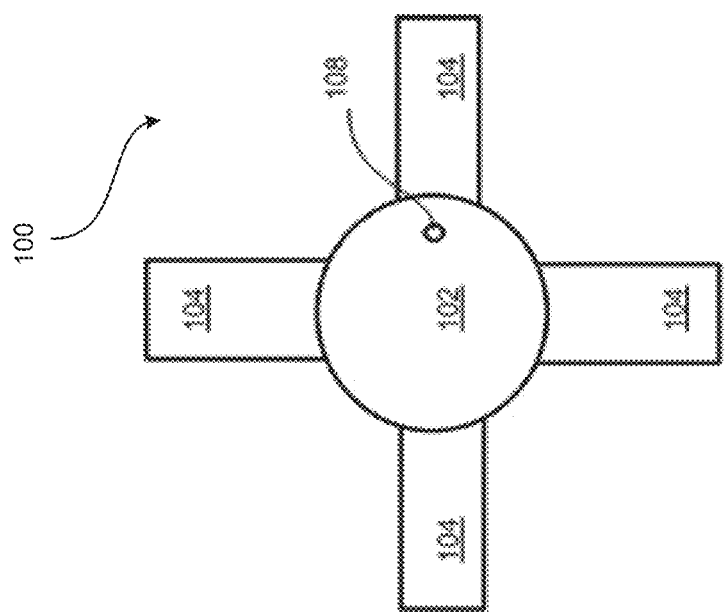
FIG. 2B illustrates a top view of an underwater vehicle in a second configuration, in accordance with one or more implementations.
Figure 2A:
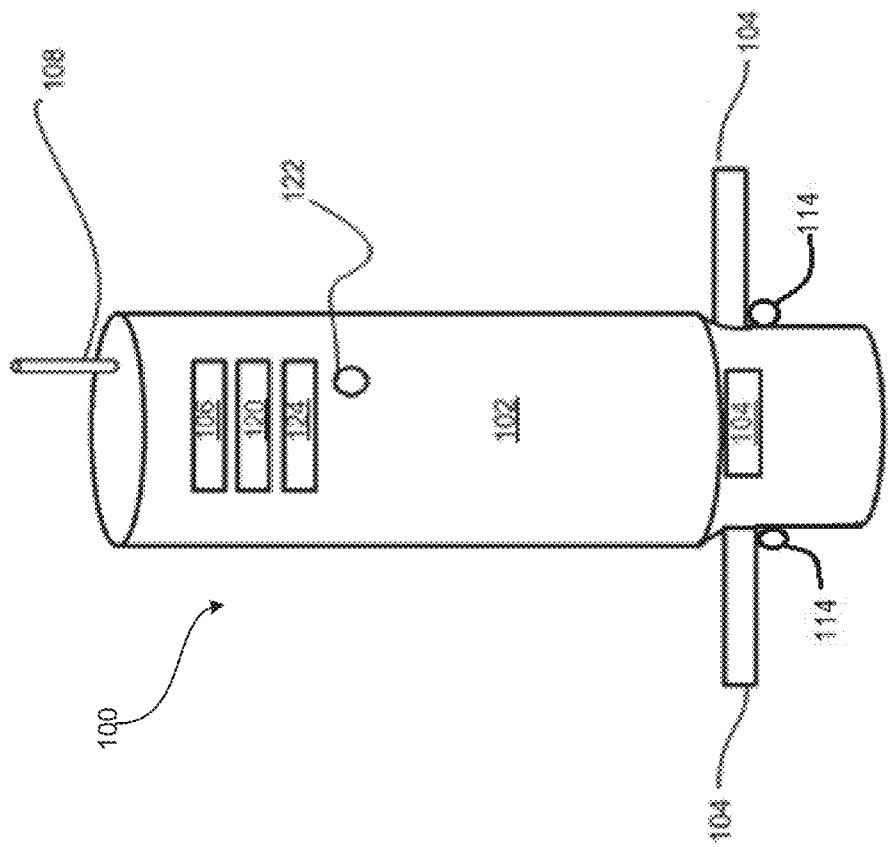
FIG. 2A illustrates a side view of an underwater vehicle in a second configuration, in accordance with one or more implementations.

The fins 104 may be hingedly attached to body 102. The hinged attachment to body 102 may enable fins 104 to rotate about a longitudinal axis and/or polar axis of body 102. In some implementations, fins 104 may be movable between a first configuration and a second configuration. For example, fins 104 in the first configuration may be positioned substantially flat against body 102 (see, e.g., FIGS. 1A and 1B). Fins 104 in the second configuration may extend radially outward from body 102 (see, e.g., FIGS. 2A and 2B). Fins 104 may be configured in a third configuration (see, e.g., FIGS. 3A and 3B). Fins 104 in the second configuration may slow descent and/or provide motion stabilization to body 102 at a water surface. Motion stabilization may prevent submersion of vehicle 100 at the water surface. For example, a large wave at the water surface may submerge a vehicle without motion stabilization. Submersion of a vehicle may interrupt information transmission. Vehicle 100 may provide motion stabilization at the water surface with fins in the second configuration thereby preventing submersion during information transmission.

Figure 4:
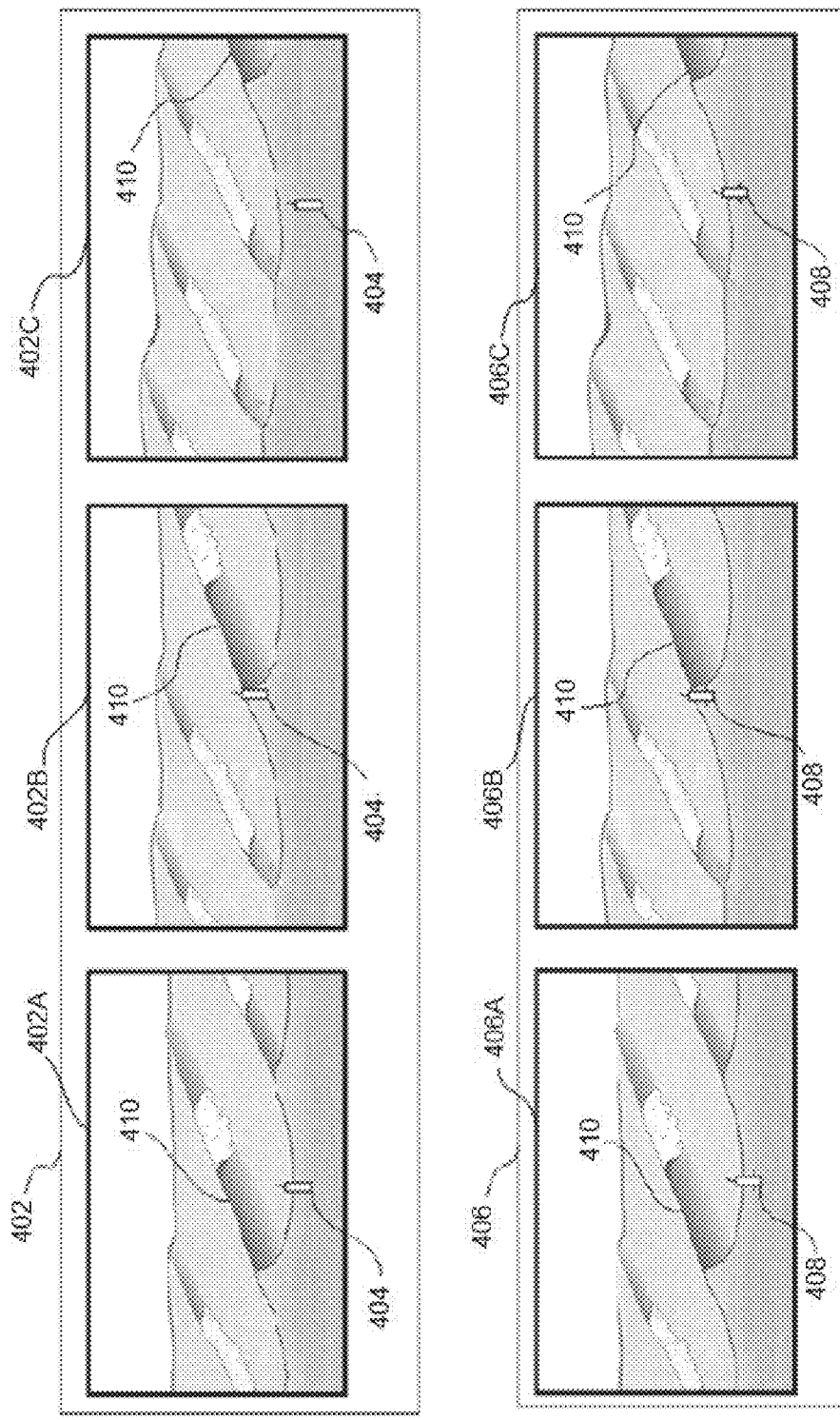
FIG. 4 illustrates motion stabilization of the vehicle at a water surface, in accordance with one or more implementations.

FIG. 4 illustrates an exemplary comparison between a scenario 402 involving a vehicle 404 lacking fins (e.g., the same as or similar to fins 104) and a scenario 406 involving a vehicle 408 that may be the same as or similar to vehicle 100. Scenarios 402 and 406 show a wave 410 propagating from left to right. In frame 402A, vehicle 404 may be located in a trough in front of wave 410. As wave 410 propagates to the right, vehicle 404 may be elevated to the crest of wave 410, as shown in frame 402B. Due to gravity and a near-neutral buoyancy of vehicle 404, vehicle 404 may fall off the back of wave 410 and plunge below the surface of the water as wave 410 passes by, as shown in frame 402C. When vehicle 404 is submerged, an information transmission may be interrupted.

Looking now at scenario 406, in frame 406A, vehicle 408 may be located in a trough in front of wave 410. As wave 410 propagates to the right, vehicle 404 may be elevated to the crest of wave 410, as shown in frame 402B. As vehicle 404 falls off the back of wave 410 due to gravity as wave 410 passes by, as shown in frame 402C, fins (e.g., the same as or similar to fins 104) on vehicle 408 may prevent vehicle 408 from becoming submerged. Thus, there may be no interruption in an information transmission being performed by vehicle 408 at the surface of the water as wave 410 passes by.

Returning to FIG. 1, movement of the fins 104 may be limited to movement between the first configuration and the second configuration. The fins 104 may be in the first configuration during deployment of the vehicle 100, during vertical profiling (e.g., descent), and/or at other times. For example, vehicle 100 may fit through a deployment tube of an aircraft or surface vessel when fins 104 are in the first configuration. The second configuration may be used subsequent to deployment, at the water surface (e.g., to provide stabilization to the vehicle 100), during vertical profiling, and/or at other times.

The one or more fins 104 may be configured to be further movable between the second configuration and a third configuration. For example, the fins in the third configuration may be positioned at an oblique angle relative to the first configuration (see, e.g., FIGS. 3A and 3B). The third configuration may be used subsequent to deployment, at the water surface, during vertical profiling (e.g., to moderate the rate of ascent and/or descent of vehicle 100), and/or at other times.

One or more fins may be configured to move to one or more configurations absent external forces. For example, fins 104 may be configured to move to the second configuration absent any external forces acting on fins 104. In some implementations, fins 104 may move from the third configuration to the second configuration absent any external forces on fins 104. Fins 104 may move from the first configuration to the second configuration absent any external forces on fins 104. Fins 104 may be configured to move to the second configuration because one or more springs 114 may be configured to move fins 104 to the second configuration.

Fins 104 may include one or more springs 114 that correspond to individual fins 104. For example, a given spring may include a coil spring, a leaf spring, and/or other type of spring. A spring 114 may be configured to apply a force to a corresponding fin. In some implementations, fin 104 may move from the first configuration to the second configuration absent any external forces on fin 104. In some implementations, spring 114 may have a spring constant configured such that fin 104 moves from the second configuration to the first configuration during assent of vehicle 100 and moves from the first configuration to the second configuration during descent of vehicle 100. For example, FIG. 5A illustrates movement of fins in response to assent of the vehicle. Fins 104 are shown moving away from the second configuration toward the first configuration. FIG. 5B illustrates movement of the fins in response to descent of the vehicle. Fins 104 are shown moving away from the second configuration toward the third configuration. In some implementations, vertical current may move fins 104.

Returning to FIGS. 1-3, springs 114 may have a first spring constant that is associated with the fins 104 moving from the first configuration to the second configuration. Springs 114 may have a second spring constant that is associated with the fins moving from the third configuration to the second configuration. In some implementations, the first spring constant may be different from the second spring constant.

Buoyancy control components 106 may be disposed within body 102. Buoyancy control components 106 may be configured to adjust a buoyancy of vehicle 100 to facilitate vertical profiling. For example, buoyancy control components 106 may control a volume of vehicle 100. Changes in the volume of vehicle 100 may affect buoyancy of vehicle 100 (e.g., while mass remains constant). In some implementations, buoyancy control components 106 may facilitate movement of an incompressible fluid (e.g., oil and/or other incompressible fluids) from within body 102 to external parts of body 102 to change the volume and thus the buoyancy of vehicle 100.

One or more sensors 116 may be disposed on one or more of fins 104. Sensors 116 may be configured to convey signals related to information about to the pressure, depth, salinity, buoyancy, sonar, and/or other information. In some implementations, sensors 116 may be located on fins 104, on or within body 102, and/or at other locations.

Antenna 108 may be disposed on top 126 of vehicle 100 and/or at other locations. Antenna 108 may transmit information related to vertical profiling via radio waves, microwaves, and/or other methods of transmission. Information related to vertical profiling may be transmitted to one or more satellites and/or other signal receivers. The transmitted information may include salinity profiles, pressure profiles (e.g., related to salinity), depth profiles, and/or other information. In some implementations, antenna 108 may transmit signals at the water surface. For example, antenna 108 may remain above the water surface during signal transmission. Antenna 108 may rely on fins 104 in the second configuration to slow descent and provide motion stabilization to body 102 at the water surface (e.g., during wave propagation). Returning to FIG. 4, motion stabilization 404 may result in vehicle 100 remaining at the water surface during wave propagation 406 and thus enable uninterrupted signal transmission.

Figure 6:
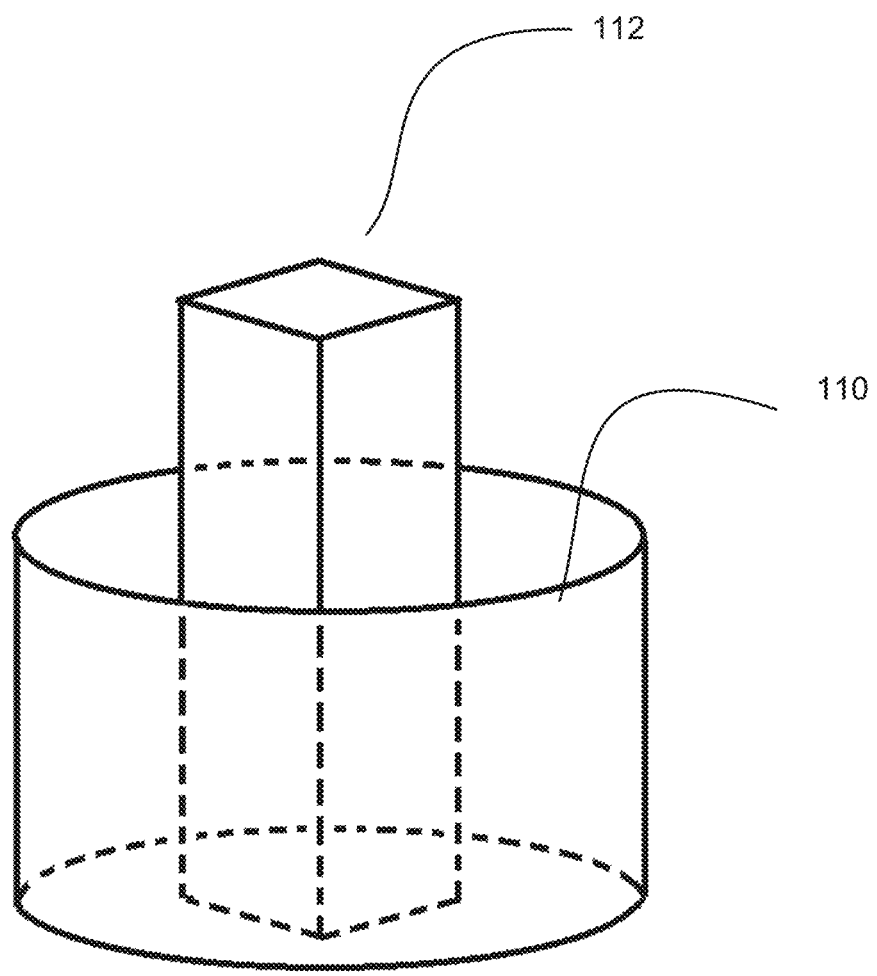
FIG. 6 illustrates a side view of a cap, in accordance with one or more implementations.

FIG. 6 illustrates a side view of a cap 110, in accordance with one or more implementations. Cap 110 may facilitate deployment, protect vehicle 100 during impact with the water-surface, release fins 104 responsive to contact with water, and/or provide other functions to vehicle 100. In some implementations, a cap 110, an absorbent member 112, and/or other components may be used to provide additional functionality to vehicle 100. FIG. 6 illustrates absorbent member 112, in accordance with one or more implementations. Absorbent member 112 may be compressible. The absorbent member 112 of cap 110 may be placed over the end of vehicle 100. Absorbent member 112 may protect components of vehicle 100 during deployment and/or impact with the water-surface. For example, absorbent material 112 may protect fins 104, buoyancy control component 106, sensors 116, processor 124, and/or other components of vehicle 100 during impact with the water surface. Cap 110 and/or absorbent member 112 may protect one or more components of vehicle 100 at other times. For example, cap 110 and/or absorbent member 112 may protect one or more components while vehicle 100 remains at the water surface. Responsive to contact with water, cap 110 and/or absorbent material 112 may absorb water to modify one or more dimensions (e.g., a shape of absorbent material 112) and be forced away from vehicle 100.

Cap 110 may be used to secure fins 104 in the first configuration. Cap 110 may include a cylinder with one end of cap 110 being substantially closed. Cap 110 may be disposed over one or more fins 104 in the first configuration to secure the fins 104 (e.g., during deployment). Cap 110 may be secured to vehicle 100 using water-soluble tape. Water-soluble tape may be configured to lose an adhesive property responsive to contact with water. For example, this configuration may enable the deployment of vehicle 100 with the fins secured in the first configuration during deployment and contact with the water surface. Subsequent to contact with the water surface, the water soluble tape may lose adhesive properties and enable the release of cap 110 from the end of vehicle 100. The release of cap 110 may enable fins 104 to move from a first configuration to a second configuration.

Cap 110 may be configured to protect one or more components of vehicle 100 when vehicle 100 impacts the water surface. For example, cap 110 may be configured to protect body 102, fins 104, buoyancy control components 106, one or more sensors 116 (e.g., disposed on body 102, fins 104, and/or otherwise disposed on vehicle 100), energy generation components 118, and/or other components of vehicle 100. FIG. 7A illustrates a side view of vehicle 100 fitted with cap 110. As illustrated in the figure, cap 110 may protect one or more components of the vehicle, including body 102, fins 104, buoyancy control components 106, sensors 116, energy generation components 118, transmitter 120, processor 124, and/or other components of vehicle 100. FIG. 7B illustrates a top view of cap 110 fitted to secure fins 104 in the first configuration during deployment.

Returning to FIG. 1, sensor 116 may be configured to convey output signals related to the salinity, pressure, temperature, depth, acidity, sonar, and/or other information. Sensor 116 may convey output signals that may be processed and/or analyzed to determine one or more features of the water column. For example, a pressure sensor may be related to the depth, pressure, salinity, and/or other features of the water column. Sensors may be disposed on body 102, fins 104, within buoyancy control components 106, and/or in other locations. Signals from sensor 116 may be processed (e.g., with processor 124 described below) and/or transmitted as unprocessed information (e.g., with transmitter 120 described below).

Spring 114 may be a leaf spring, a coil spring, and/or other type of spring. In some implementations, fins 104 may have an elastic material property. For example, fins 104 may be constructed from an elastic material (e.g., with sufficient non-plastic yield) to allow fins 104 to deflect to the first and/or third configurations (e.g., from the second configuration) without plastic deformation. In this example, the elastic material properties of fins 104 may be selected to include spring 114. In some implementations, spring 114 may apply a force on one or more fins 104 to hold fins 104 in a particular configuration absent any external forces. For example, spring 114 may apply a force on one or more fins 104 to hold fins 104 in the second configuration absent any external forces.

Figure 8:
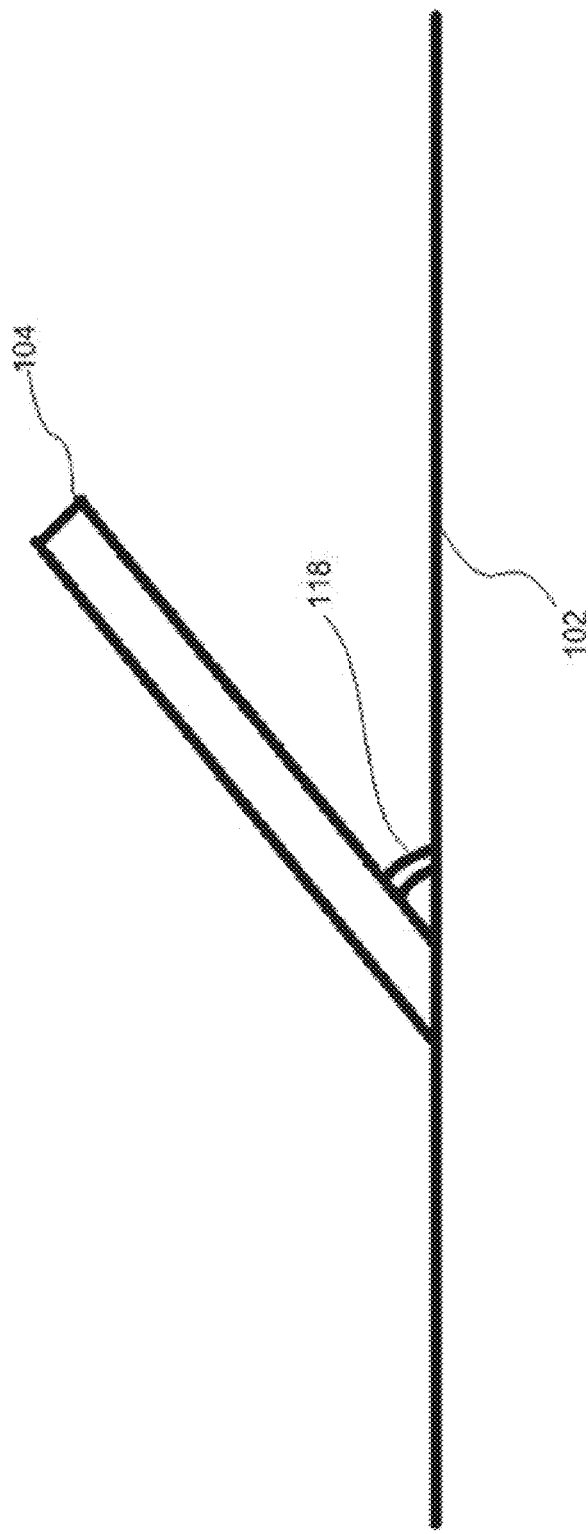
FIG. 8 illustrates a profile view of an energy generation component located on a leaf-spring in accordance with one or more implementations.

FIG. 8 illustrates an energy generation component 118. Energy generation component 118 may be configured to generate energy responsive to movement of fins 104. For example, energy generation component 118 may be configured to generate energy responsive to movement between the first configuration and the second configuration. Energy generation component 118 may supply energy to one or more components within vehicle 100. For example, generated energy may supply energy to processor 124, a transmitter 120, and/or other electronic components of vehicle 100. For example, energy generation component 118 may store energy through electrical induction through a coil of spring 114 (e.g., as shown in FIG. 1 and described herein). In some implementations, energy generation component 118 may store generated kinetic and/or potential energy. Energy generation component 118 may store generated energy as electrical energy. Energy generation component 118 may transform mechanical kinetic and/or potential energy into electrical energy to power one or more electrical components of vehicle 100.

Returning to FIG. 1, transmitter 120 may be equipped with an antenna 108 disposed on vehicle 100. In some implementations, transmitter 120 is disposed on the top of vehicle 100 to enhance the signal transmitted. Transmitter 120 may utilize antenna 108 to transmit information related to vertical profiling to one or more satellites and/or other signal receivers. The transmitted information may include salinity profiles, pressure profiles (e.g., related to salinity), the depth of the vertical profiling, and/or other information. In some implementations, transmitter 120 may transmit signals at the water surface. For example, transmitter 120 may rely on motion stabilization of fins 104 to slow descent of vehicle 100 and keep antenna 108 above the water surface to transmit a signal. In some implementations, transmitter may obtain signals from one or more sensors 116 to determine whether vehicle 100 is at the water-surface and/or ready to begin transmission.

Figure 9:
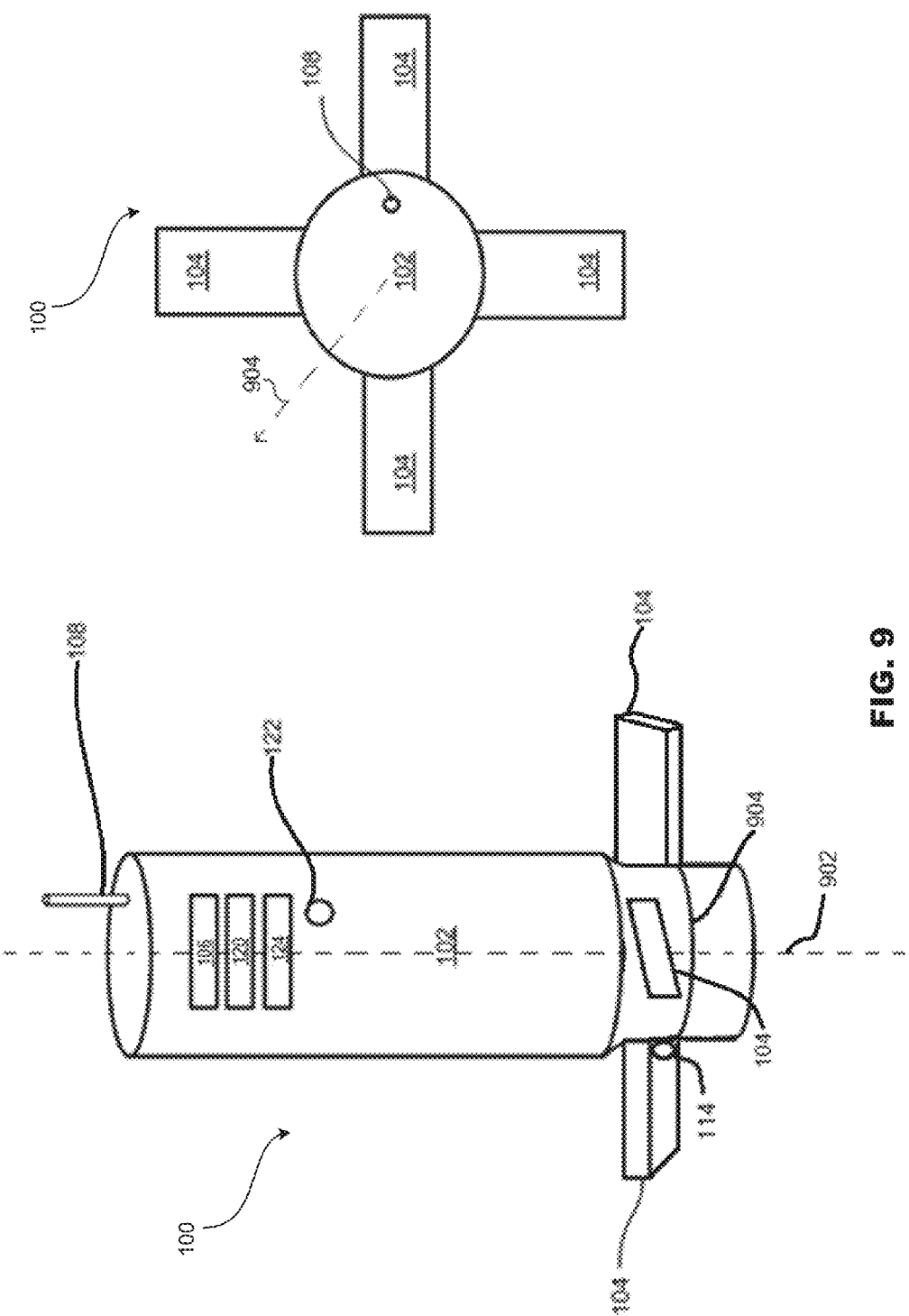
FIG. 9 illustrates the vehicle configured to rotate about a longitudinal axis with pitched fins, in accordance with one or more implementations.

Fins 104 may be pitched in the second configuration. FIG. 9 illustrates vehicle 100 configured to rotate about a longitudinal axis 902 with pitched fins 104. As illustrated in FIG. 9, fins 104 may be disposed on body 102 at an angle to a polar axis 904 of body 102. The pitched position of fins 104 may enable vehicle 100 to revolve about a longitudinal axis 902 of vehicle 100 during vertical profiling. In some implementations, the pitched position of fins 104 may be dynamically controlled (e.g., by positioning spring 114 based on signals from a processor 124, described below). Fins 104 may be pitched on body 102 due to the spring constant of one or more springs 114. For example, the spring constant associated with a particular fin 104 may cause a pitch on the particular fin 104. In some implementations, spring 114 may be dynamically positioned to control an effective spring constant in one or more directions. For example, changing the location of a leaf spring 114 on body 102 may change the effective spring constant of leaf spring 114 for movements between the first configuration and the second configuration. The hinged attachment of fins 104 to body 102 may be angled to the polar axis 904 such that a pitch is created at the hinged attachment. In some implementations, a modification of the location on fin 104 that one or more springs 114 applies a force may generate a pitch on the fin 104 (e.g., a processor 124, as described below, may control the location of spring 114 on fin 104).

In some implementations, vertical current may be measured by vehicle 100. Vehicle 100 may have pitched fins 104 in the second configuration (e.g., as illustrated in FIG. 9). The buoyancy of vehicle 100 may be controlled such that vehicle 100 descends. As vehicle 100 descends the pitch on fins 104 may cause vehicle 100 to revolve about longitudinal axis 902 of vehicle 100. An individual revolution may correspond to a traversed depth of vehicle 100. The number of revolutions about the longitudinal axis experienced by vehicle 100 during the descent of vehicle 100 may be determined and/or sensed. For example, a compass 122 may be included to determine the number of revolutions about longitudinal axis 902 and determine a water displacement of vehicle 100 based on the number of revolutions. The vertical distance of travel during the descent may be determined based on depth information (e.g., from one or more sensors). For example, a pressure change of the traversed depth may be sensed to determine the change in depth. The difference between the determined water displacement and the determined distance of travel may be used to determine the vertical current.

Vehicle 100 may include compass 122, in accordance with one or more implementations. Compass 122 may be used to determine an orientation of vehicle 100 about longitudinal axis 902. Compass 122 may enhance resolution of the location of a vertical profile taken by vehicle 100. For example, a direction of an object relative to vehicle 100 may be determined with the compass 122. In some implementations, the object may be stationary (e.g., a landmark or beacon) to designate the location of vehicle 100 during vertical profiling. The object may be non-stationary. For example, the object may be a boat, other profiling vehicle(s), marine life, litter, and/or other objects.

In some implementations, the buoyancy of vehicle 100 may be controlled (e.g., by buoyancy control components 106) so that vehicle 100 descends. As vehicle 100 descends, the pitch on one or more fins 104 may cause vehicle 100 to revolve about longitudinal axis 902 of vehicle 100. The location, direction, and/or distance of the object may be sensed using a first sensor 116 disposed on a first fin 104 and a second sensor 116 disposed on a second fin 104. The first sensor 116 may provide a first signal that increases in strength when the first fin 104 is pointed toward the object and decreases in strength when the first fin 104 is pointed away from the object. The second sensor 116 may provide a second signal that increases in strength when the second fin 104 is pointed toward the object and decreases in strength when the second fin 104 is pointed away from the object. The direction, location, and/or distance of the object relative to vehicle 100 may be determined based on the obtained first signal and the obtained second signal.

Vehicle 100 may include one or more physical processors 124 to control aspects of vertical profiling, motion stabilization, and/or data transmission. The processor(s) 124 may include one or more of a digital processor, an analog processor, a digital circuit designed to process information, an analog circuit designed to process information, a state machine, and/or other mechanisms for electronically processing information. Although processor 124 is shown in FIGS. 1-3, 7, and 9 as a single entity, this is for illustrative purposes only. In some implementations, processor(s) 124 may include a plurality of processing units. These processing units may be physically located within the same device, or processor(s) 124 may represent processing functionality of a plurality of devices operating in coordination (e.g., apparatus 100 and a personal computing device). The processor(s) 124 may be configured to execute computer program instructions. The processor(s) 124 may be configured to execute computer program by software; hardware; firmware; some combination of software, hardware, and/or firmware; and/or other mechanisms for configuring processing capabilities on processor(s) 124. This may include one or more physical processors during execution of processor readable instructions, the processor readable instructions, circuitry, hardware, storage media, and/or any other media.

Figure 10:
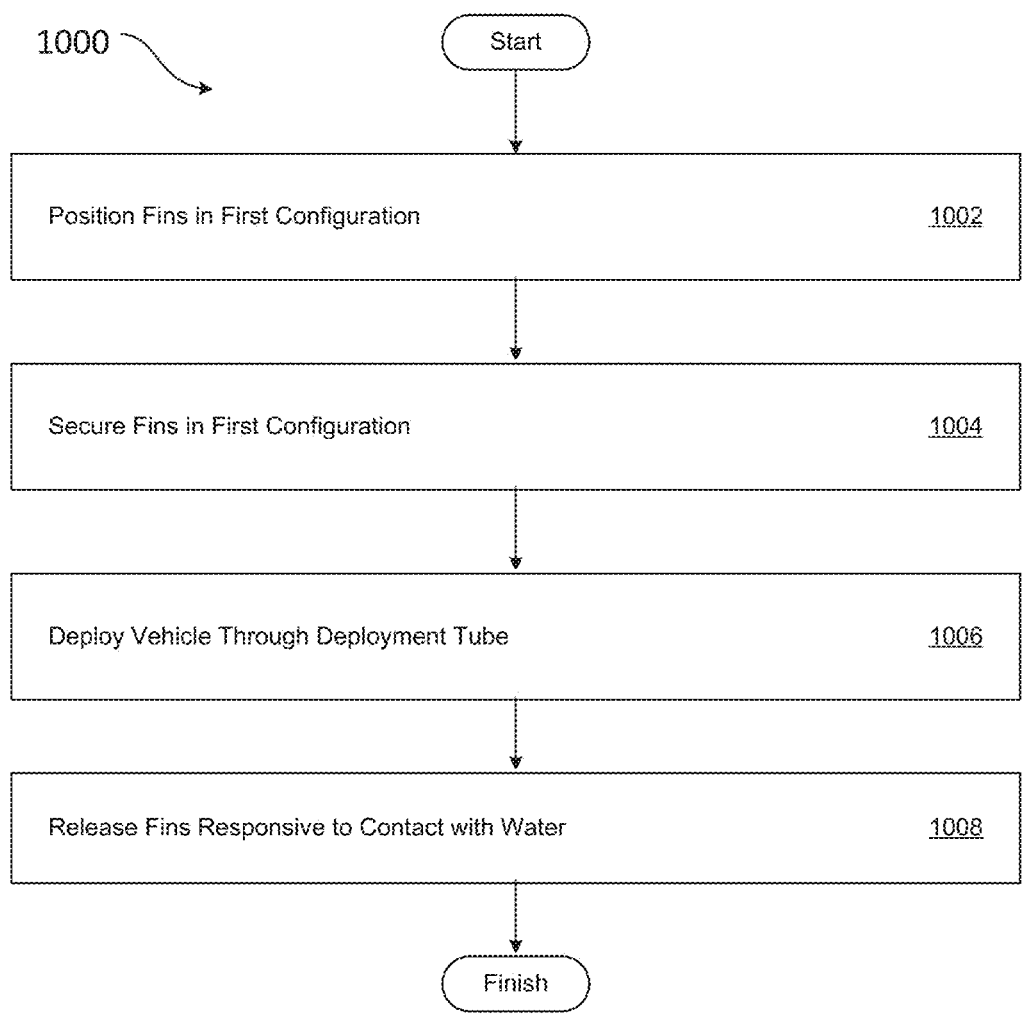
FIG. 10 illustrates a method for deploying an underwater vertical profiling vehicle from a deployment tube of an aircraft or surface vessel, in accordance with one or more implementations.
Figure 11:
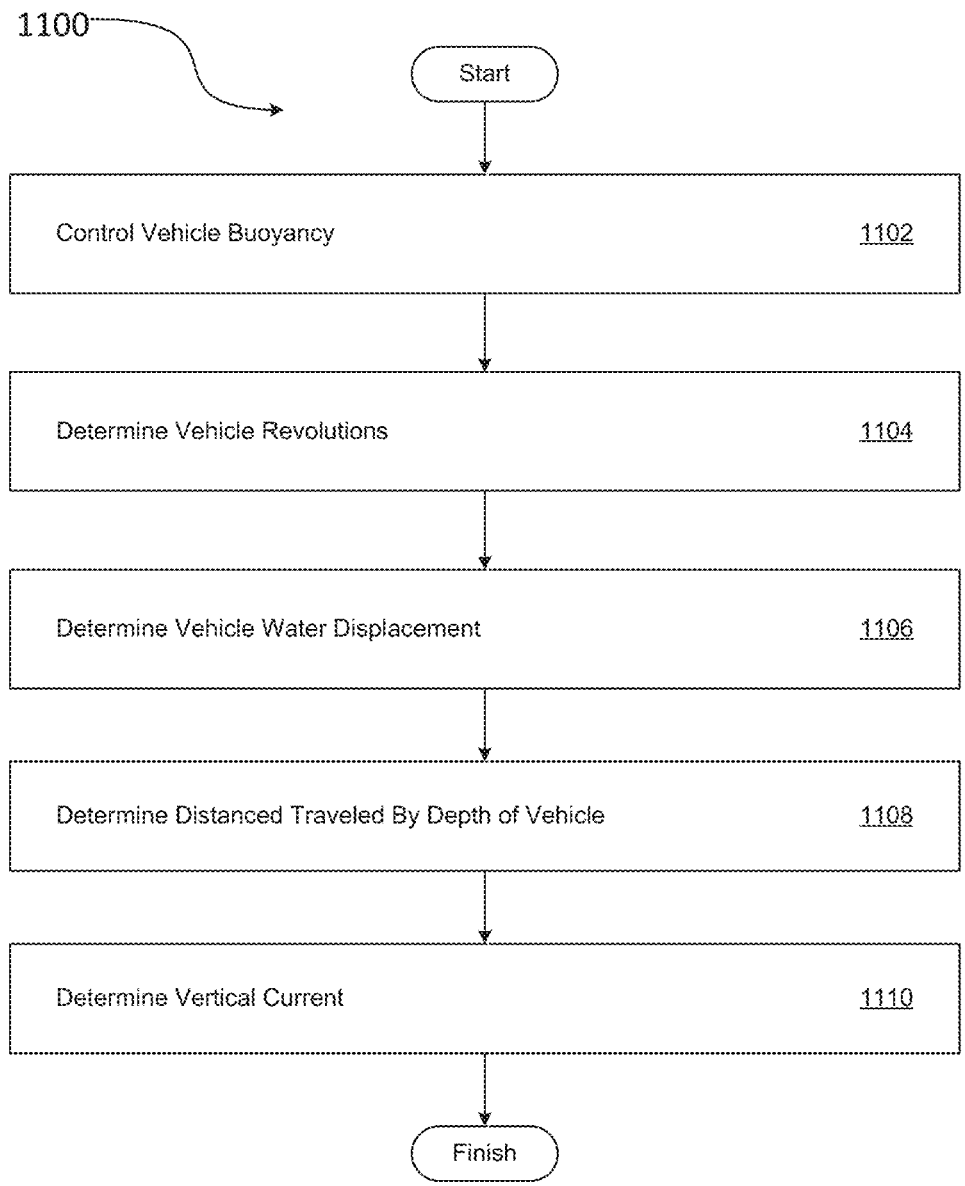
FIG. 11 illustrates a method for measuring vertical current with an underwater vertical profiling vehicle, in accordance with one or more implementations.
Figure 12:
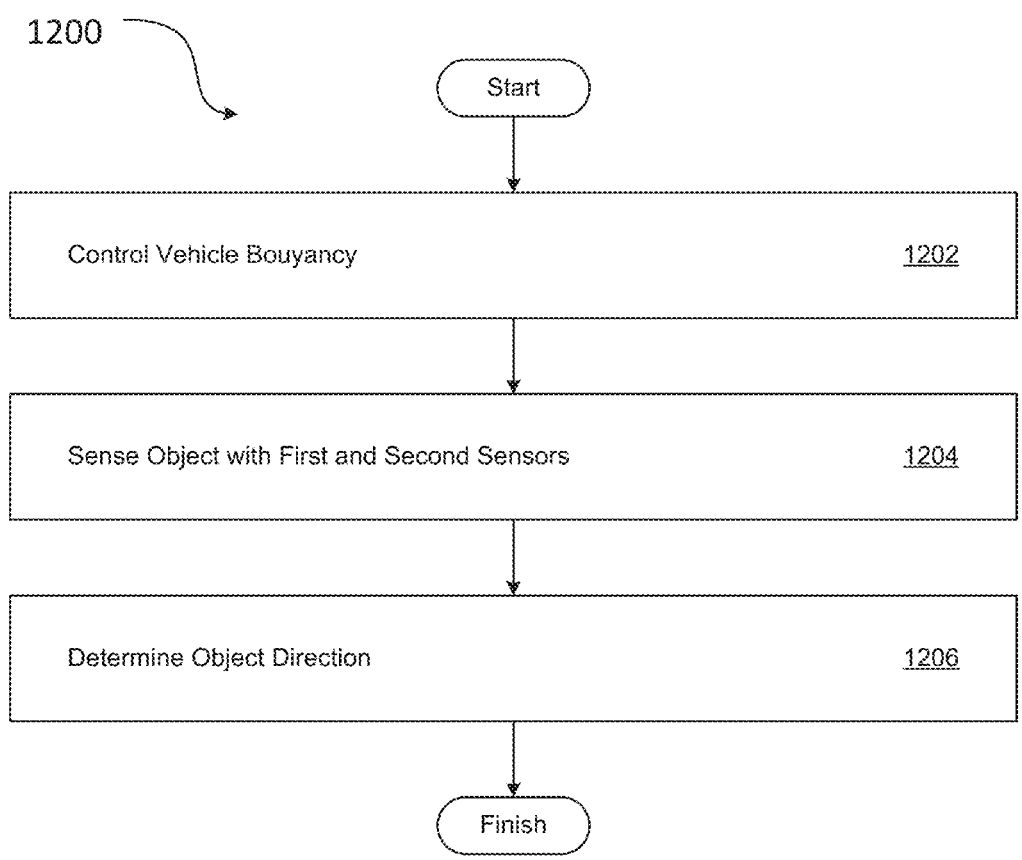
FIG. 12 illustrates a method for providing directional resolution in sensing underwater objects using an underwater vertical profiling vehicle, in accordance with one or more implementations.

FIGS. 10-12 illustrate methods (e.g., 1000, 1100, and 1200, respectively) for operating an underwater vehicle (e.g., vehicle 100) configured to perform vertical profiling, in accordance with one or more implementations. The operations of methods 1000, 1100, and 1200 presented below are intended to be illustrative. In some implementations, methods 1000, 1100, and 1200 may be accomplished with one or more additional operations not described, and/or without one or more of the operations discussed. Additionally, the order in which the operations of methods 1000, 1100, and 1200 are illustrated, in FIGS. 10, 11, and 12 respectively, and described below is not intended to be limiting.

In some implementations, methods 1000, 1100, and/or 1200 may be implemented wholly or partially in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 1000, 1100, and/or 1200 in response to instructions stored electronically on an electronic storage medium. The one or more processing devices may include one or more devices configured through hardware, firmware, and/or software to be specifically designed for execution of one or more of the operations of methods 1000, 1100, and/or 1200.

FIG. 10 illustrates a method for deploying an underwater vertical profiling vehicle from a deployment tube of an aircraft or surface vessel, in accordance with one or more implementations.

At an operation 1002, fins may be positioned into the first configuration. Operation 1002 may be performed by a user deploying the vehicle, according to some implementations.

At an operation 1004, the fins may be secured in the first configuration such that the fins remain in the first configuration during deployment. Operation 1004 may be performed using a cap (e.g., the same as or similar to cap 110) according to some implementations.

At an operation 1006, the vehicle may be deployed by sending the vehicle through a deployment tube. An underwater vertical profiling vehicle (e.g., vehicle 100) may be deployed from a deployment tube of an aircraft or surface vessel to a body of water (e.g., ocean, lake, river, and/or other body of water).

At an operation 1008, the fins may be released responsive to contact with water to facilitate movement of the fins between the first configuration and the second configuration during vertical profiling. Operation 1008 may be facilitated by a cap and/or an absorbent member the same as or similar to cap 110 and/or absorbent member 112, in accordance with some implementations.

FIG. 11 illustrates a method for measuring vertical current with an underwater vertical profiling vehicle, in accordance with one or more implementations.

At an operation 1102, the buoyance of the vehicle may be controlled such that the vehicle descends and revolves about the longitudinal axis of the vehicle due to the pitch of the fins. Operation 1102 may be performed by buoyancy control components and fins the same as or similar to buoyancy control components 106 and fins 104 as shown and described herein.

At an operation 1104, the number of revolutions experienced by the vehicle may be determined during the descent of the vehicle. Operation 1104 may be performed by a processor the same as or similar to processor 124, according to some implementations.

At an operation 1106, the water displacement of the vehicle may be determined based on the number of revolutions of the vehicle. Operation 1106 may be performed by sensor(s) the same as or similar to sensor(s) 116.

At an operation 1108, the distance of travel during the descent based on depth information may be determined. Operation 1108 may be performed by sensor(s) the same as or similar to sensor(s) 116.

At an operation 1110, the vertical current may be determined based on a difference between the water displacement and the distance of travel. Operation 1110 may be performed by a processor the same as or similar to processor 124.

FIG. 12 illustrates a method for providing directional resolution in sensing underwater objects using an underwater vertical profiling vehicle, in accordance with one or more implementations.

At an operation 1202, the buoyancy of the vehicle may be controlled so that the vehicle descends, the vehicle revolving about the longitudinal axis due to the pitch of the fins. Operation 1202 may be performed by buoyancy control components and fins the same as or similar to buoyancy control components 106 and fins 104 as shown and described herein.

At an operation 1204, an underwater object may be sensed using a first sensor disposed on a first fin and a second sensor disposed on a second fin. The first sensor may provide a first signal that increases in strength when the first fin is pointed toward the underwater object and decreases in strength when the first fin is pointed away from the underwater object. The second sensor may provide a second signal that increases in strength when the second fin is pointed toward the underwater object and decreases in strength when the second fin is pointed away from the underwater object. Operation 1204 may be performed by a sensor the same as or similar to sensor 116 as shown and described herein.

At an operation 1206, the direction of the underwater object relative to the vehicle may be determined based on the first signal and the second signal. Operation 1206 may be performed by a processor, the same as or similar to processor 124.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method for deploying an underwater vertical profiling vehicle from a deployment tube of an aircraft or surface vessel; the vehicle comprising a body, buoyancy control components, and fins; the body comprising a cylindrical shape; the buoyancy control components being disposed within the body, the buoyancy control components being configured to adjust a buoyancy of the vehicle to facilitate vertical profiling; the fins being disposed on the body, the fins being hingedly attached to the body, the fins being movable between a first configuration and a second configuration, in the first configuration the fins being positioned substantially flat against the body, in the second configuration the fins extending radially outward to slow descent and to provide motion stabilization; the method comprising:
   positioning the fins into the first configuration;
   securing the fins in the first configuration by disposing a cylindrical cap over the fins such that the fins remain in the first configuration during deployment;
   deploying the vehicle by sending the vehicle through the deployment tube; and
   responsive to contact with water, releasing the cylindrical cap to facilitate movement of the fins between the first configuration and the second configuration during vertical profiling.

2. The method of claim 1, further comprising securing the cylindrical cap to the vehicle using water-soluble tape, the water-soluble tape being configured to lose an adhesive property responsive to contact with water.

3. The method of claim 1, wherein the cylindrical cap comprises absorbent member that contacts an end of the vehicle when the cylindrical cap is disposed over the fins in the first configuration, the absorbent member being configured to absorb water responsive to the vehicle contacting water, the absorbent member expanding responsive to absorbing water such that the cylindrical cap is forced away from the vehicle releasing the fins.

4. The method of claim 1, wherein the cylindrical cap is configured to protect one or more components of the vehicle when the vehicle impacts the water surface.

5. The method of claim 1, wherein the cylindrical cap includes a cylinder with one end being substantially closed.

6. A method for measuring vertical current with an underwater vertical profiling vehicle; the vehicle comprising a body, buoyancy control components, and fins; the body comprising a cylindrical shape; the buoyancy control components being disposed within the body, the buoyancy control components being configured to adjust a buoyancy of the vehicle to facilitate vertical profiling; the fins being disposed on the body, the fins being hingedly attached to the body, the fins being movable between a first configuration and a second configuration, in the first configuration the fins being positioned substantially flat against the body, in the second configuration the fins extending radially outward to slow descent and to provide motion stabilization, the fins in the second configuration being pitched so as to revolve the vehicle about a longitudinal axis of the vehicle during vertical profiling; the method comprising:
   controlling the buoyancy of the vehicle so that the vehicle descends, the vehicle revolving about the longitudinal axis due to the pitch of the fins;
   determining a number of revolutions experienced of the vehicle during the descent of the vehicle;
   determining a water displacement of the vehicle based on the number of revolutions;
   determining a distance of travel during the descent based on depth information; and
   determining a vertical current based on a difference between the water displacement and the distance of travel.

7. A method for providing directional resolution in sensing underwater objects using an underwater vertical profiling vehicle; the vehicle comprising a body, buoyancy control components, and fins; the body comprising a cylindrical shape; the buoyancy control components being disposed within the body, the buoyancy control components being configured to adjust a buoyancy of the vehicle to facilitate vertical profiling; the fins being disposed on the body, the fins being hingedly attached to the body, the fins being movable between a first configuration and a second configuration, in the first configuration the fins being positioned substantially flat against the body, in the second configuration the fins extending radially outward to slow descent and to provide motion stabilization, the fins in the second configuration being pitched so as to revolve the vehicle about a longitudinal axis of the vehicle during vertical profiling, individual ones of the fins having a sensor disposed thereon; the method comprising:

controlling the buoyancy of the vehicle so that the vehicle descends, the vehicle revolving about the longitudinal axis due to the pitch of the fins;

sensing an underwater object using a first sensor disposed on a first fin and a second sensor disposed on a second fin, the first sensor providing a first signal that increases in strength when the first fin is pointed toward the underwater object and decreases in strength when the first fin is pointed away from the underwater object, the second sensor providing a second signal that increases in strength when the second fin is pointed toward the underwater object and decreases in strength when the second fin is pointed away from the underwater object;

determining a direction of the underwater object relative to the vehicle based on the first signal and the second signal.

\* \* \* \* \*